United States Patent [19]

Stewart et al.

[11] Patent Number: 5,894,581
[45] Date of Patent: Apr. 13, 1999

[54] METHOD FOR REDUCING CONTROL STORE SPACE IN A VLSI CENTRAL PROCESSOR

[75] Inventors: Wilbur L. Stewart, Phoenix; Richard L. Demers, Peoria; Ronald E. Lange; Lowell D. McCulley, both of Glendale, all of Ariz.

[73] Assignee: Bull HN Information Systems Inc., Billerica, Mass.

[21] Appl. No.: 08/048,339

[22] Filed: Apr. 15, 1993

[51] Int. Cl.$^6$ .................................................... G06F 7/00
[52] U.S. Cl. ...................... 395/800.01; 395/598; 341/87
[58] Field of Search ............................... 395/800, 400, 395/425, 800.01, 598; 364/DIG. 1; 341/95, 63, 51, 87; 711/100

[56] References Cited

U.S. PATENT DOCUMENTS

| | | | |
|---|---|---|---|
| 4,620,275 | 10/1986 | Wallach et al. | 346/DIG. 1 |
| 4,701,745 | 10/1987 | Waterworth | 340/347 DD |
| 5,053,951 | 10/1991 | Nusinov et al. | 364/DIG. 1 |
| 5,122,949 | 6/1992 | Harper et al. | 395/109 |
| 5,123,101 | 6/1992 | Sindhu | 395/400 |
| 5,367,674 | 11/1994 | Berk et al. | 395/600 |

*Primary Examiner*—Meng-Ai T. An
*Assistant Examiner*—Walter D. Davis, Jr.
*Attorney, Agent, or Firm*—J. S. Solakian; J. H. Phillips; E. W. Hughes

[57] ABSTRACT

In order to reduce the size of the memory employed to store firmware, the firmware is written in virtual control words which are then reduced by allotting them to a primary control word memory and at least one secondary control word memory which is addressed by a field in the primary control word memory. A virtual set of secondary control words are each divided into a plurality of fields, and each field of each secondary virtual control word is marked as guarded or "don't care". If a field is marked as "don't care", the function represented by the virtual control word will perform properly no matter what the content of that field. Virtual control word pairs are then examined to ascertain if they can be combined into a single control word. If the guarded fields in the first virtual control word align with the "don't care" fields in the second virtual control word and vice versa, the two virtual control words can be combined into a single control word containing the contents of the guarded fields from both virtual control words, the remaining fields, if any, remaining "don't care". This process may be reiterated to determine if the combined control word can be further combined with another virtual control word. In operation, all the functions represented by a combined control word are executed by calling for that single control word stored in the secondary control word memory.

7 Claims, 10 Drawing Sheets

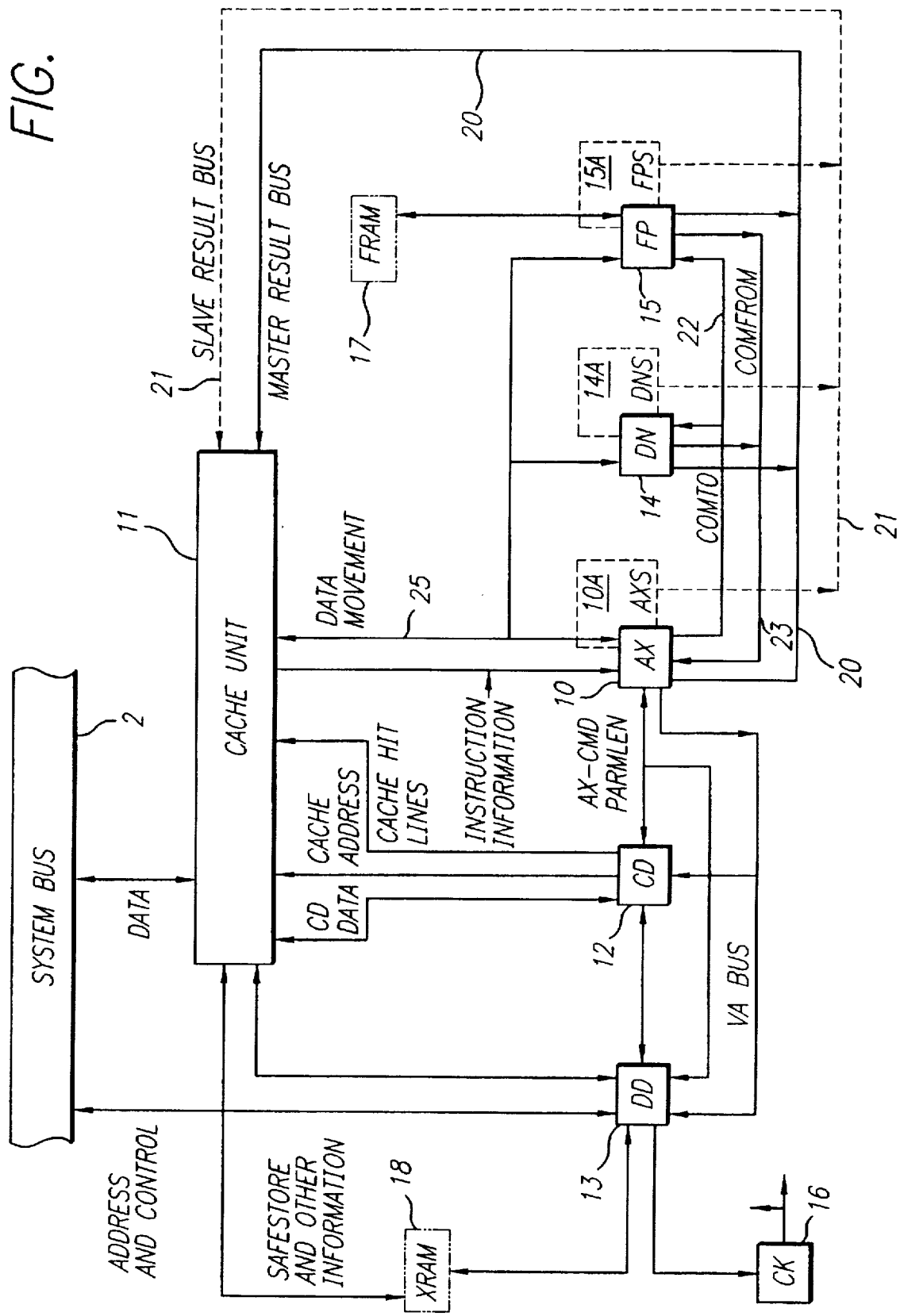

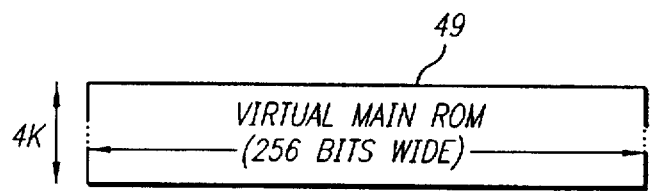
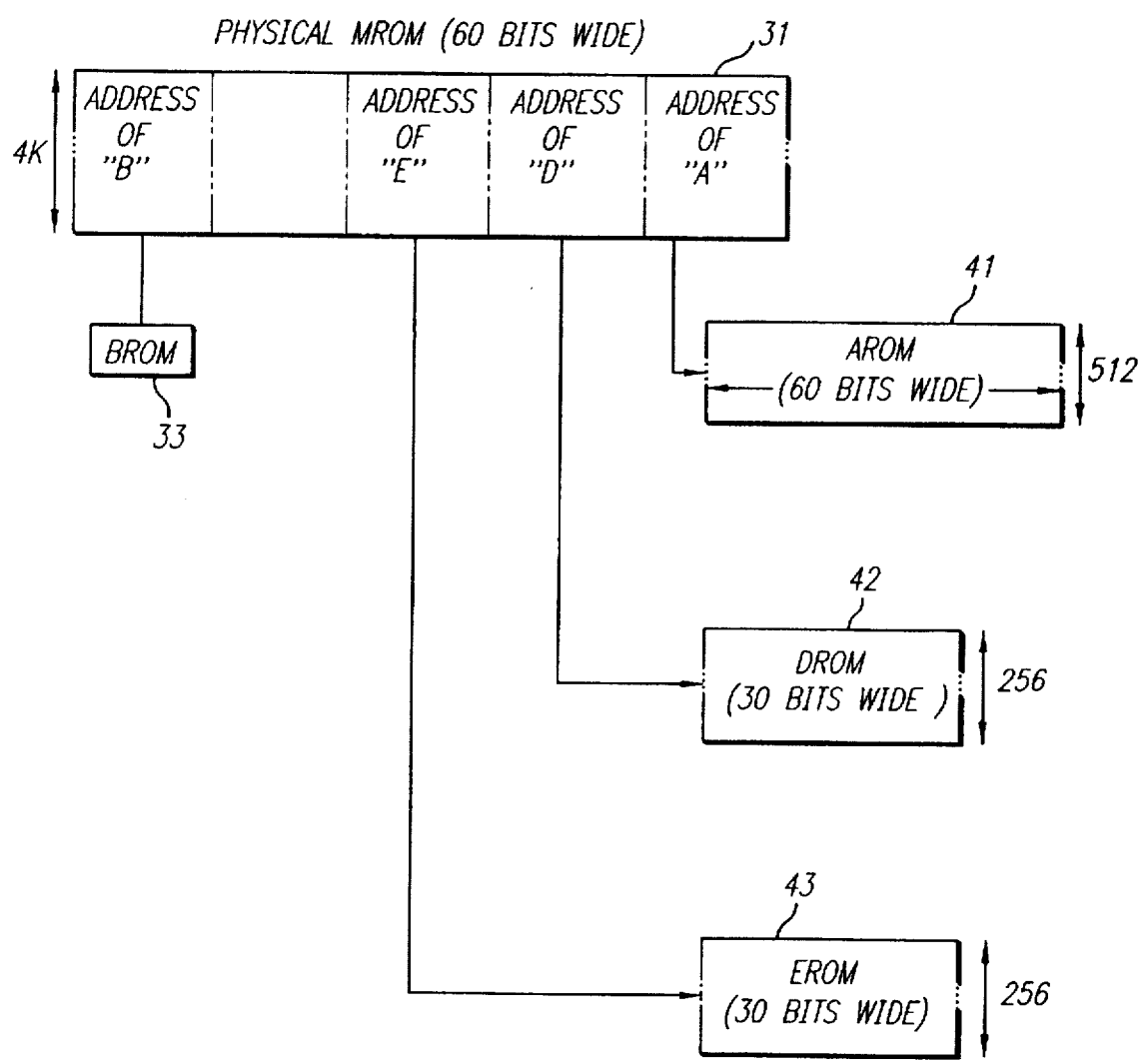
FIG. 4
FIG. 5

* – GUARDED BY DEFAULT

| | | |
|---|---|---|
| 24 | YCON_EABUS (CONT) | |
| 6 | Y_HLD | |
| 27 | | |
| 28 | | |
| 7 | FLAG_ID | |
| 31 | | |
| 32 | Y_OVRD | |
| 8 | XOPS_SHIFT_B | |
| 35 | | |
| 36 | | |
| 9 | AQX_MODE | |
| 39 | AQX_HLD | |
| 40 | | |
| 10 | XOPS_ADD_A | |
| 43 | | |
| 11 | 44 | * FLAG_SR |
| 47 | ILI_CON | |
| 48 | | |
| 12 | XOPS_CIN | |
| 51 | TAG | |
| 52 | | |
| 13 | 55 | ILI_AB_IN |
| 56 | | |
| 14 | * DIRECT | |
| 59 | ILI_CIN | |

| | | |
|---|---|---|
| 0 | 00 | AR_WD_OVRD |
| | | ILI_ADD |
| | 03 | ILI_RES |
| | 04 | AR_IN_HLD |
| 1 | 07 | * ENA_TRUN |
| | 08 | AR_TEA |
| 2 | | TEA_WT |
| | 11 | * AR_WT |
| | 12 | * ILI_TALLY |
| | | DESC_STROBE |
| 3 | | ILIA_SEL_ADR |
| | 15 | |
| 4 | 16 | ILIB_ADR |
| | 19 | |
| | 20 | ILIB_ADR_SEL |
| 5 | | YCON_EABUS |
| | 23 | |

FIG. 9

| FIELD A (GUARDED) | FIELD B (DON'T CARE) | FIELD C (DON'T CARE) | FIELD D (GUARDED) |
|---|---|---|---|

CONTROL WORD #1

| FIELD A (GUARDED) | FIELD B (GUARDED) | FIELD C (DON'T CARE) | FIELD D (DON'T CARE) |
|---|---|---|---|

CONTROL WORD #2

| FIELD A (GUARDED) | FIELD B (GUARDED) | FIELD C (DON'T CARE) | FIELD D (GUARDED) |
|---|---|---|---|

COMBINED CONTROL WORD

1

METHOD FOR REDUCING CONTROL STORE SPACE IN A VLSI CENTRAL PROCESSOR

FIELD OF THE INVENTION

This invention relates to computer systems and, more particularly, to efficient storage of control words required to execute instructions in a central processor.

BACKGROUND OF THE INVENTION

As faster operation of computer systems has been sought, numerous hardware/firmware features have been employed to achieve that purpose. One feature widely incorporated in central processing units (CPUs) that is directed to increasing the speed of operation is pipelining in which the various stages of execution of a series of consecutive machine level instructions are undertaken simultaneously. For example, during a given time increment, a first stage of a fourth (in order of execution) instruction may be undertaken while a second stage of a third instruction, a third stage of a second instruction and a fourth stage of a first instruction are all undertaken simultaneously. This procedure dramatically increases the speed of operation of a CPU.

The execution of the instructions in the repertoire of instructions of a CPU requires the coordinated sequential generation of numerous control signals, and these control signal combinations are particularly complex and diverse in a pipelined CPU. The control signals are typically derived from firmware stored in a read-only-memory (ROM). This firmware consists of stored control words, each control word representing a combination of binary signals, or bits, necessary to carry out a microstep in the execution of one or more instructions.

In the CPU family in which the subject invention finds exemplary use, a virtual control word set, or control program, of on the order of 4K words of 256 bits each is required to provide for all the necessary signal combinations for performing the numerous microsteps during execution of the instruction set of the CPU. This CPU family is implemented in very large scale integrated (VLSI) circuitry on several chips including an address and execution (AX) chip which incorporates the ROM containing the control word set. However, those skilled in the art will understand that, at the state of the art, a ROM of 4K by 256 bits would take up much of the room available for circuitry on a VLSI chip. Since the remainder of the AX chip is itself very complex, a ROM of this size cannot be accommodated, and this constraint presented a serious problem which was successfully addressed by the use of the present invention. Further, in combination with other innovations, a very significant additional decrease in the size of the control store ROM for the AX chip was achieved.

OBJECTS OF THE INVENTION

It is therefore a broad object of this invention to provide a control store for a CPU which is relatively small, but which is capable of storing a complete set of the control combinations necessary to specify all microsteps required to execute the full instruction repertoire of the CPU.

It is a more specific object of this invention to provide such a control store divided into a main rom (MROM), basic rom (BROM) an address rom (AROM), a first secondary address rom (DROM) and a second secondary address rom (EROM) and to selectively address the BROM, AROM, DROM and EROM from fields in control words stored in the MROM and to perform certain other operations on the information stored in at least the AROM which permits the further reduction of the physical size thereof.

SUMMARY OF THE INVENTION

Briefly, these and other objects of the invention are achieved by writing the firmware in virtual control words which are then reduced by allotting them to a primary control word memory and at least one secondary control word memory which is addressed by a field in the primary control word memory. A virtual set of secondary control words, or secondary nanocontrol words are each divided into a plurality of fields, and each field of each secondary virtual control word is marked as guarded or "don't care". If a field is marked as "don't care", the function represented by the virtual control word will perform properly no matter what the content of that field. Secondary nanocontrol word pairs are then examined to ascertain if they can be combined into a single control word. If the guarded fields in the first secondary nanocontrol word align with the "don't care" fields in the second secondary nanocontrol word and vice versa, the two control words can be combined into a single control word containing the contents of the guarded fields from both secondary nanocontrol words, the remaining fields, if any, remaining "don't care". This process may be reiterated to determine if the combined control word can be further combined with another secondary nanocontrol word. In operation, all the functions represented by a combined control word are executed by calling for that single control word stored in the secondary control word memory.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is a representation of the virtual control word format used to write the firmware for the execution and control unit;

FIG. 5 is a partial block diagram of the execution and control unit illustrating the manner in which subsidiary ROMs for storing control words are addressed from the main ROM;

FIG. 9 is a simplified example of the application of the invention in a specific instance.

DESCRIPTION OF THE PREFERRED EMBODIMENT(S)

Figures 1, 3:
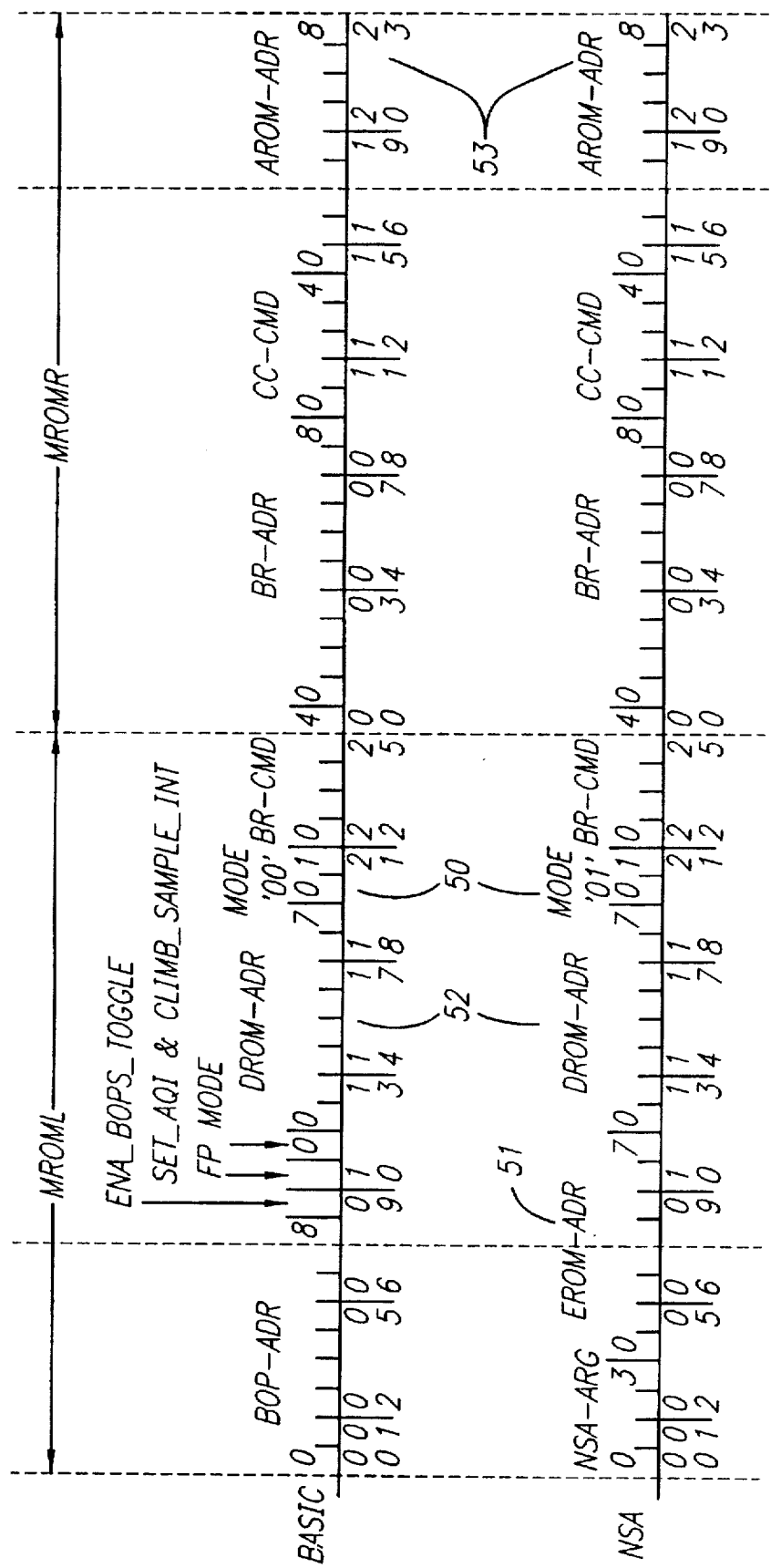
FIG. 1 is a block diagram of a central processing unit in which the subject invention may be employed.
FIG. 3 is a representation of the four different modes in which control words may be stored and used in a main ROM component of the address and execution unit.
Figures 2, 3:
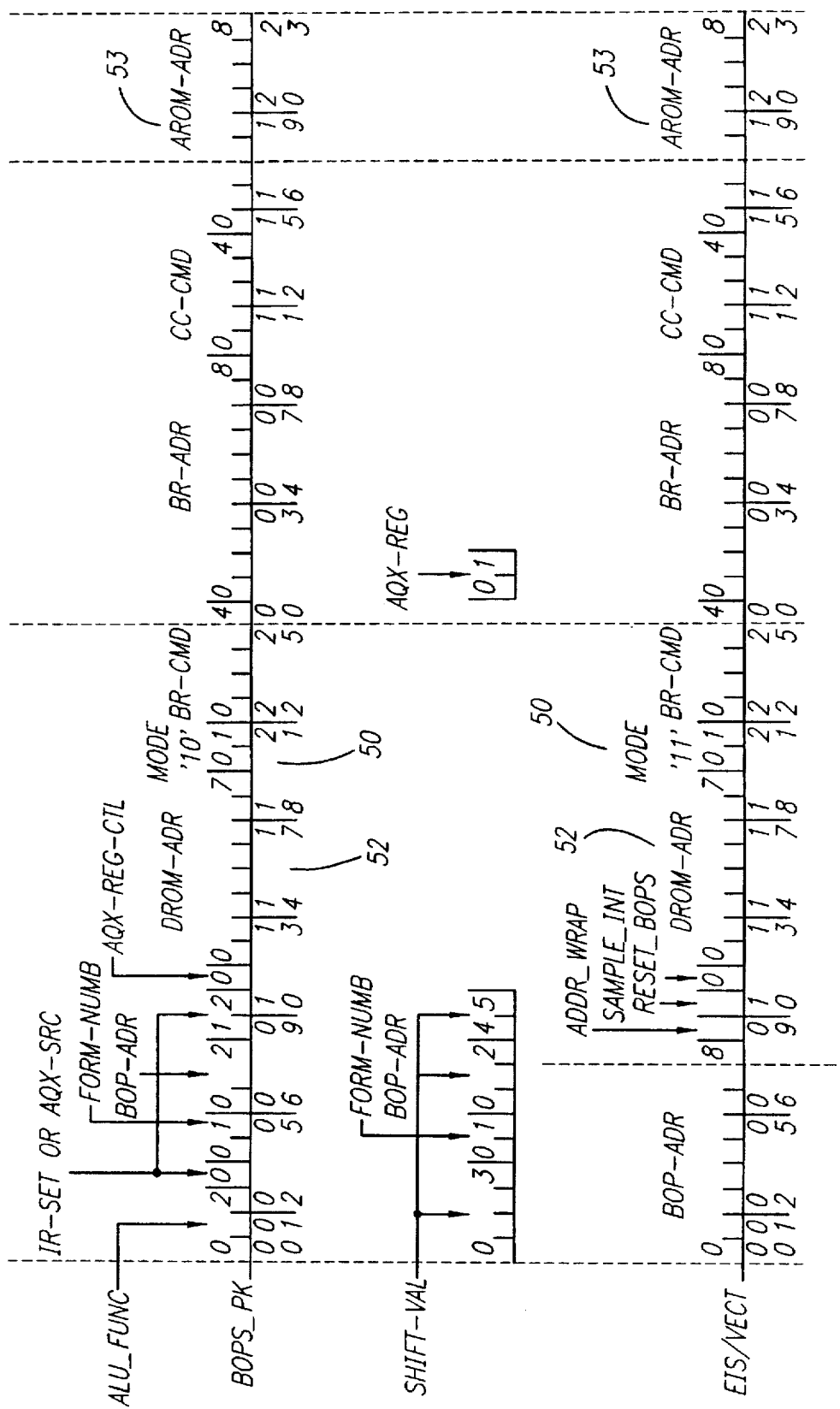

Referring to FIG. 1, the Address and Execution Unit (AX unit) is a microprocessing engine the circuits of perform all address preparation and executes all instructions except decimal arithmetic, binary floating point and multiply/divide instructions. Two identical AX chips 10, 10A perform duplicate actions in parallel, and the resulting AX chip outputs are constantly compared to detect errors. The main functions performed by the AX unit include:

effective and virtual address formation;

memory access control;

security checks;

register change/use control;

execution of basic instructions, shift instructions, security instructions, character manipulation and miscellaneous instructions.

The cache unit 11 includes a data part of 64K bytes (16K words) and a set associative directory pall which defines the main memory location of each 64-byte (16-word) block stored in the cache data part. Physically, the cache unit is implemented in an array of ten DT chips and has directly associated with it a cache directory (CD) chip 12 and a duplicate directory (DD) chip 13.

The specific functions performed by the cache unit 11 include:

combined instruction and operand data storage;

instruction and operand buffering and alignment;

data interface with the system bus 7 (FIG. 1);

CLIMB safestore file.

Two copies of the cache directory information are respectively maintained in the CD and DD chips which perform different logic functions. The two directory copies allow interrogation of the cache contents from the system bus in parallel and without interference with instruction/operand access from the CPUs and also provide for error recovery. Functions performed by the CD chip 12 include:

cache directory for CPU accesses;

instruction, operand and store buffer management;

virtual-to-real address translation paging buffer.

Functions performed by the DD chip 13 include:

cache directory for system accesses;

system bus control;

distributed connect/interrupt management;

cache directory error recovery.

Efficient scientific calculation capability is implemented on the Floating Point (FP) coprocessor chips 15, 15A. The identical FP chips execute all binary floating point arithmetic in duplicate. These chips, operating in concert with the duplicate AX chips 10, 10A, perform scalar or vector scientific processing.

The FP chip 15 (duplicated by the FP chip 15A):

executes all binary and fixed and floating point multiply and divide operations;

computes 12 by 72-bit partial products in one machine cycle;

computes eight quotient bits per divide cycle;

performs modulo 15 residue integrity checks.

Functions performed by the FP chips 15, 15A include:

executes all floating point mantissa arithmetic;

executes all exponent operations in either binary or hexadecimal format;

preprocesses operands and postprocesses results for multiply and divide instructions;

provides indicator and status control.

Two special purpose random access memories (FRAM 17 and XRAM 18) are incorporated into the CPU. The FRAM chip 17 is an adjunct to the FP chips 15, 15A and functions as an FP control store. The XRAM chip 18 is an adjunct to the AX chips 10, 10A and serves as a scratchpad as well as providing safestore and patch functions.

The CPU also employs a Clock Distribution (CK) chip 16 whose functions include:

clock distribution to the several chips constituting the CPU;

shift path control;

maintenance;

interface between an external Clock and Maintenance Unit and CPU;

provision of clock stop logic for error detection and recovery.

The DN chip 14 (in parallel with the DN chip 14A) performs the execution of decimal numeric Extended Instruction Set (EIS) instructions. It also executes Decimal-to-Binary (DTB), Binary-to-Decimal (BTD) conversion EIS instructions and Move-Numeric-Edit (MVNE) EIS instructions in conjunction with the AX chip 10. The DN chip both receives operands from memory and sends results to main memory (not shown) via the cache unit 11.

The AX, DN and FP chips, collectively, are sometimes referred to as the Basic Processing Unit (BPU). It was previously noted that the AX, DN and FP chips are duplicated with the duplicate units operating in parallel to obtain duplicate results which are available for integrity checking. Thus, master and slave results are obtained in the normal operation of these chips. The master results are placed onto a Master Result Bus (MRB) 20 while the slave results are placed onto a Slave Result Bus (SRB) 21. Both the master and slave results are conveyed, on the MRB and SRB respectively, to the cache unit 11. In addition, a COMTO ("command to") bus 22 and a COMFROM ("command from") bus 23 couple together the AX unit, the DN unit and the FP unit for certain interrelated operations.

Figure 2:
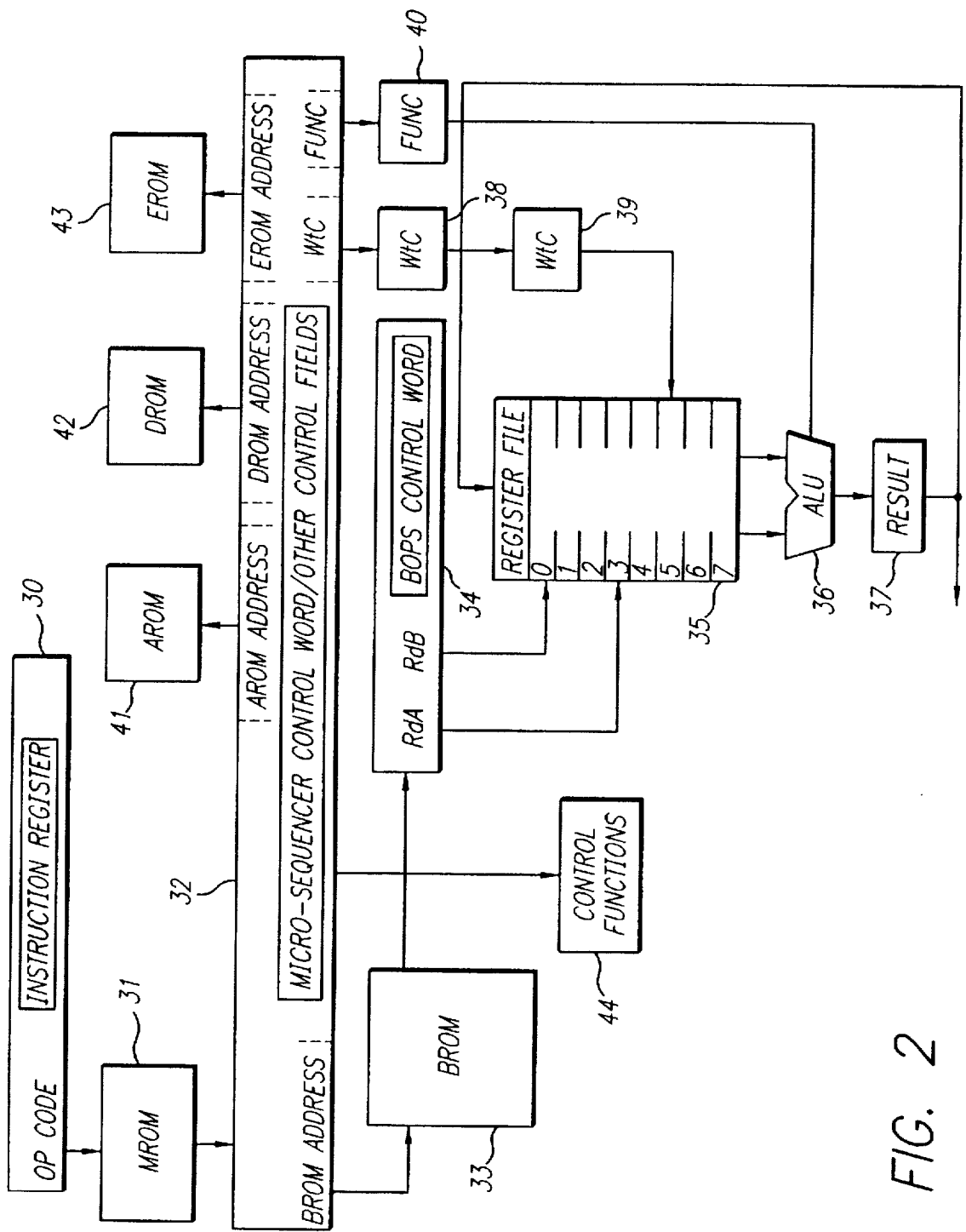
FIG. 2 is a simplified block diagram of the address and execution unit of the central processor shown in FIG. 1.

Referring now to FIG. 2, the AX chip 10 of the CPU shown in FIG. 1 incorporates, by way of simplified example, an instruction register 30, a main rom or MROM 31, a micro-sequencer control word register 32, a basic rom or BROM 33, a basic operations (BOPS) control word register 34, a register file 35, an arithmetic and logic unit (ALU) 36 and a result register 37. Typically, the AX chip also includes intermediate write control (WtC) registers 38, 39 and ALU function control (FUNC) register 40. In accordance with the present invention, the AX chip also includes the subsidiary control word ROMs: AROM 41, DROM 42 and EROM 43. As will be discussed more fully below, high priority control functions 44 may be carried out directly under the influence of signals issued by the micro-sequencer control register 32.

Also referring briefly to FIG. 3, a given main control word, or primary nanocontrol word stored in the MROM 31, called by a corresponding opcode issued by the instruction register 30 to reside in nicro-sequencer control word register 32, may be any one of four types: basic, new systems architecture (NSA), basic operations packed (BOPS_PK) or EIS/vector. (For certain practical reasons, the main control word is made up of two 25-bit words, MROML and MROMR, but for purposes of explaining the present invention, it may be considered a single word.) The type of main control word is defined in the two-bit mode field 50.

Secondary nanocontrol words stored in the EROM 43 are only used in the execution of a few special instructions relating to certain recently developed hardware. Secondary nanocontrol words stored in the DROM are used in performing certain paging operations and other address modification operations in the transfer of operand blocks into the BPU. Secondary nanocontrol words stored in the AROM contain the fundamental addressing information for operations to be performed during the addressing of operand blocks. Still referring to FIG. 3 as well as FIG. 2, the EROM address field, which appears only in the NSA mode, is indicated at 51. The DROM and AROM address fields, which appear in all modes, are indicated at 52 and 53, respectively.

Attention is now directed to FIGS. 4 and 5. FIG. 4 represents a virtual main rom 49. In the CPU family in which the subject invention finds exemplary use, a virtual control word set, or control program, of on the order of 4K words of 256 bits each is required to provide for all the necessary signal combinations for performing the numerous microsteps during execution of the instruction set of the CPU. As previously discussed, those skilled in the art will understand that a physical ROM of this size would take up an unacceptably large fraction of the room available for circuitry on the VLSI AX chip. As described above, in order to decrease the size of the MROM 31, the primary nanocontrol words stored therein contain address fields to the other control ROMS: AROM 41, BROM 33, DROM 42 and EROM 43. Conventional bit packing techniques may be employed to reduce the overall size of the control word ROMs, but not to the extent desired, and it is in the application of the subject invention that a further significant decrease in the required control word ROM storage is achieved.

When the firmware is written, it is prepared using the virtual word which, as noted, is much larger than can be physically implemented. After the firmware is defined and checked out with simulation, the control words must be compacted into a size which can be implemented. The virtual ROM bits are sorted (manually or using a suitable brief program) into groups.

The first group are those controls which must be fast and which are used early in the logic. These are used directly from the MROM by, for example, the blocks 38, 40, 44 shown in FIG. 2. A relatively small number of controls used in the NSA mode only are used from the EROM which, as previously noted, is addressed only from the MROM in the NSA mode.

The remaining control signals, all related to addressing, are used from the AROM and DROM which are themselves addressable in all modes of MROM operation, and it is in the coding of the information in these ROMs that the subject invention finds use in the exemplary system. As previously mentioned, conventional bit packing techniques may be employed to reduce the necessary size of the AROM and BROM; however, this technique did not result in a sufficient reduction in their size. It is in the subsequent steps according to the invention that this further reduction is achieved.

In order to reduce the size of the AROM, for example, the secondary nanocontrol words are merged into a set of nanowords which perform the desired function(s) for a given microstep along with any other function(s) which have no effect upon the microstep. According to the invention, this is achieved by merging secondary nanocontrol word pairs which have the same values in fields which both words care about or have different values if one of the words doesn't care about the given field. Whether or not a control word "cares" about the state of a field is determined by a field mask which is set by the microcode assembler each time a microfunction sets the state of the field. In coding the microsteps, each programmer will get the default state of each field for which no entry is made. This microstep, of course, will have been tested with these defaults in place. However, because of the merging process, these fields may be replaced by non-default values when the nano-ROM is produced if, according to the mask, the word "doesn't care" about the state of the field. In order to assure the proper state of the masks, a series of "guard functions" is provided in the assembler which allow the firmware programmer to specify the default state of those firmware fields which will have an effect upon each microstep.

Figures 1, 6:
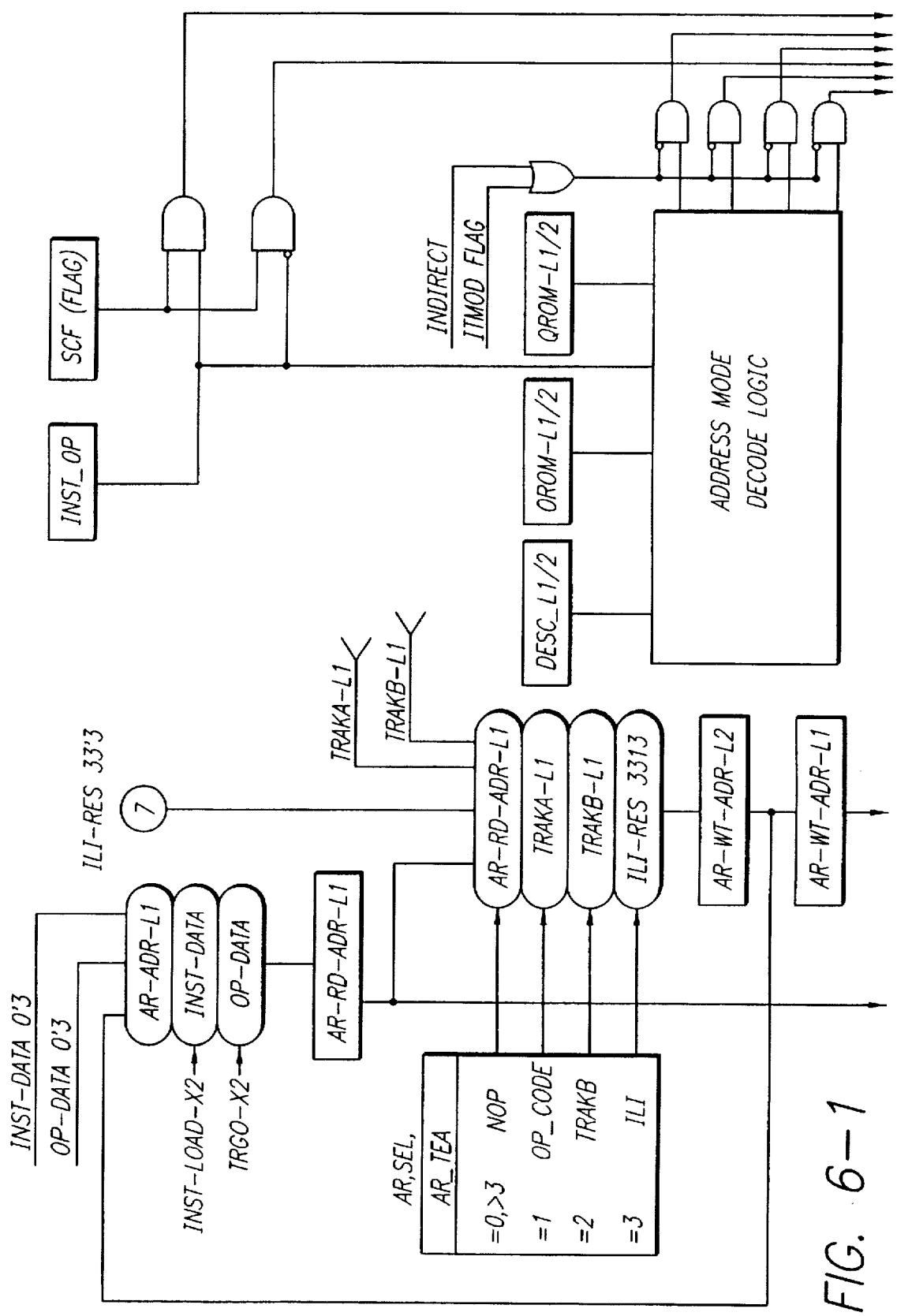
FIG. 6 is a logic diagram illustrating the functional relationship among an exemplary fraction on the control signals present in the address and instruction unit.
Figures 2, 6:
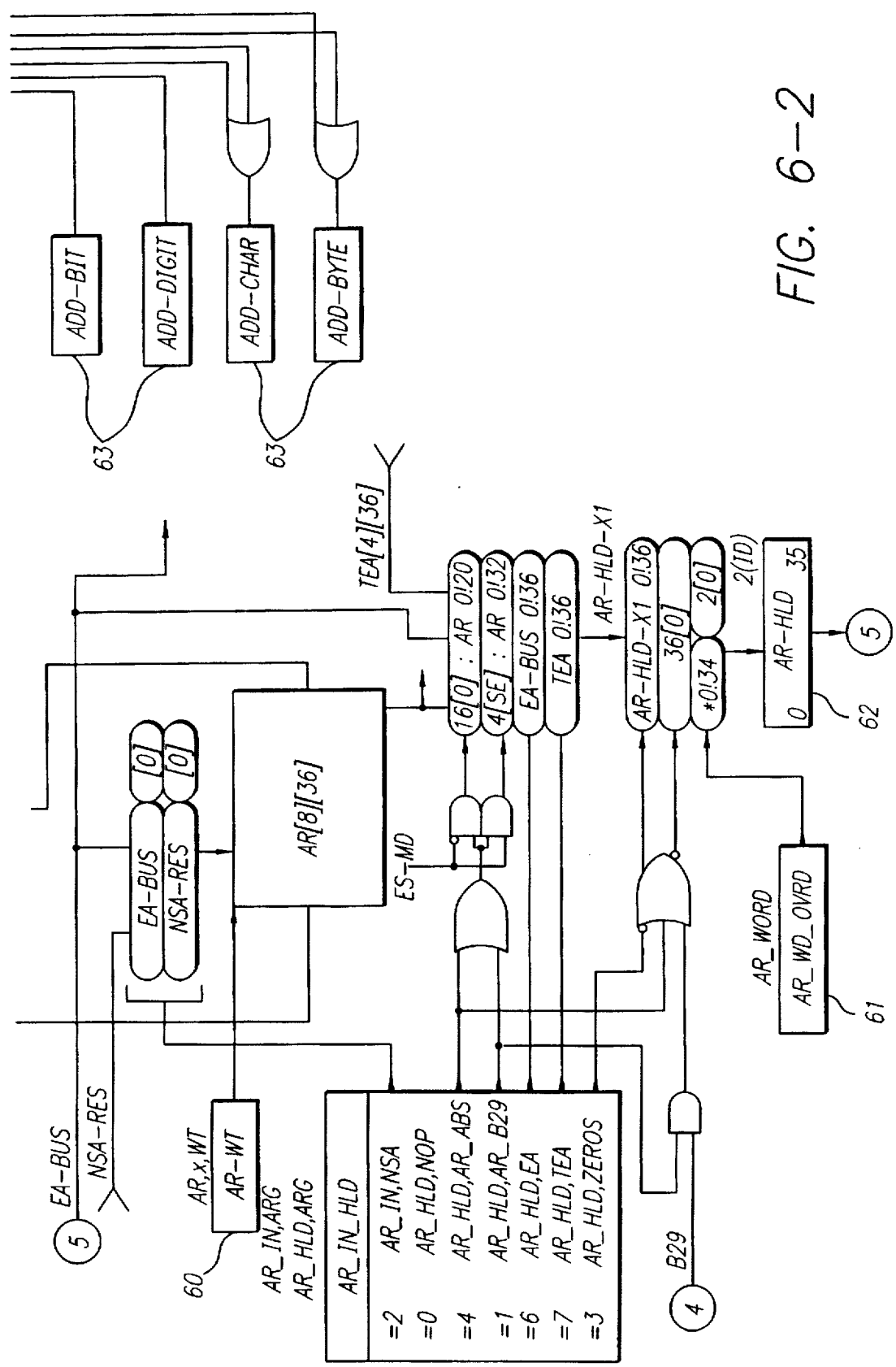
Figure 7:
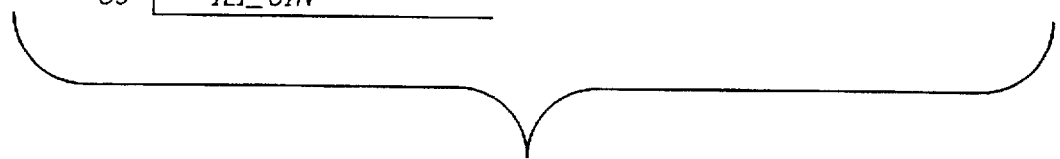
FIG. 7 is a representation of the fields present in an AROM addressed from the main ROM.

Referring now to FIGS. 6 and 7, FIG. 6 is an exemplary control signal diagram. Those skilled in the art will understand that this diagram is one of many which, all taken together, represent all the control signals necessary to perform all the functions within the capability of the AX chip. (It may be noted that it is not necessary to understand the meaning of the various control signals to obtain a full appreciation of the subject invention, and therefore no description of the actual functions of the control signals is discussed.) FIG. 7 is a representation of the configuration of the secondary nanocontrol words stored in the AROM.

In FIG. 6, four types of fields are represented: 1) those which are guarded by default, 2) those which are guarded at the option of the programmer, 3) those which are guarded under predetermined conditions and 4) those for which there is no need to be guarded. For example:

AR_WT —This control signal, represented by the block 60, will be guarded by default.

AR_HLD —This control signal, represented by the block 62, is guardable at the option of the firmware programmer by using AR_HLD,NOP.

AR_WD_OVRD —This control signal, represented by the block 61, will be automatically guarded whenever there is used AR_HLD,x which does not coexist with AR_WORD.

ADD-BIT, ADD-DIGIT, ADD-CHAR, ADD BYTE— These mode field control signals, represented by blocks 63, need not be guarded.

It will be observed that, while some of the signals shown in FIG. 6 are directly represented in the AROM (FIG. 7) as designated fields, others are not and must be guarded indirectly by the appropriate control field states.

Figure 8:
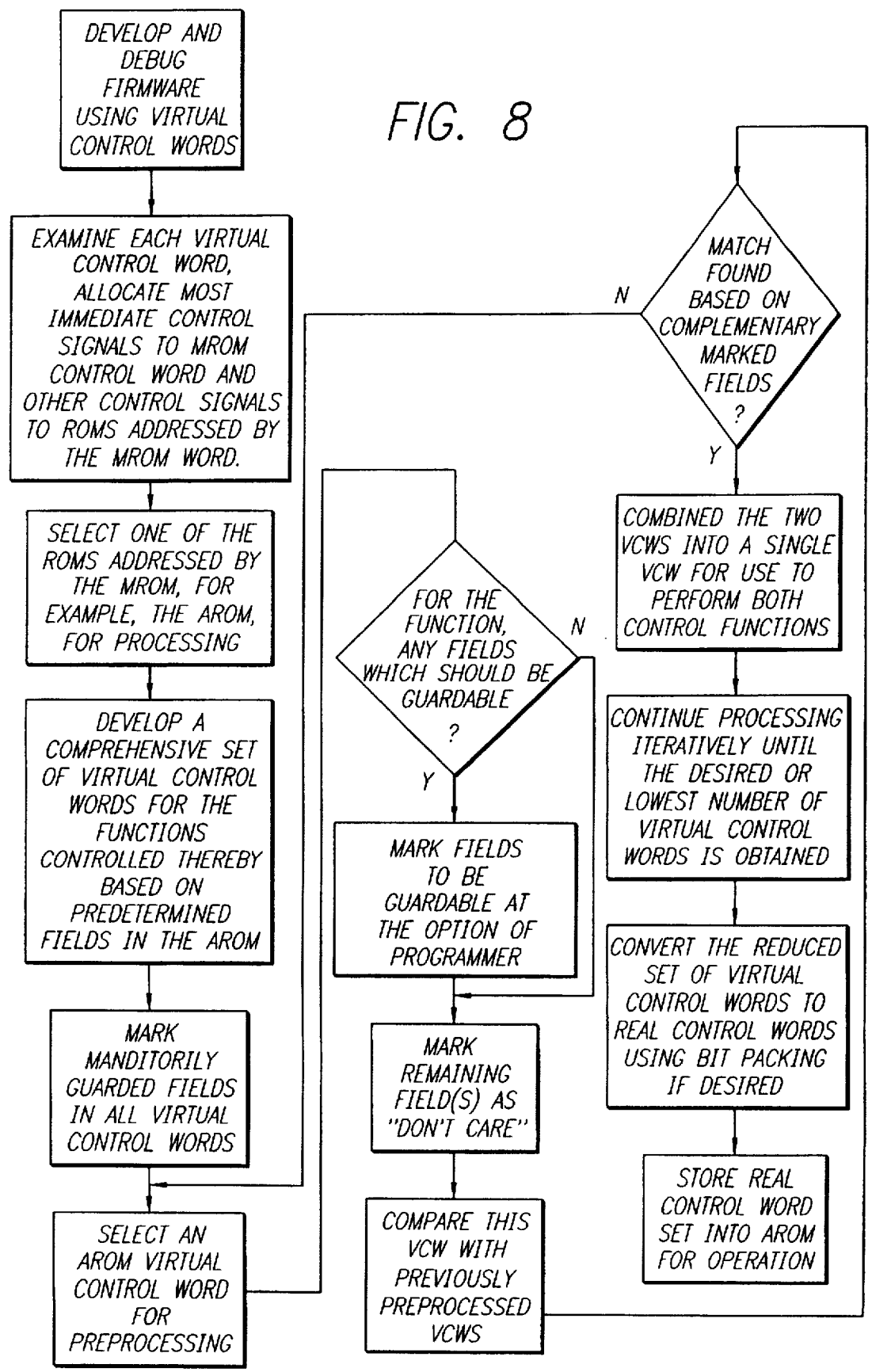
FIG. 8 is a flow diagram illustrating an exemplary method for practicing the subject invention.

The presently preferred method of practicing the invention is set out with more particularity in the flowchart shown in FIG. 8. After the firmware has been written in virtual control words and debugged by simulation or any other appropriate method, the process of reducing the amount of storage required for the corresponding physical control words is undertaken. The earliest required control signals are allocated to reserved fields in the MROM word as previously discussed, and other control signals are obtained by accessing the BROM, AROM, DROM and EROM which are individually addressed by address fields stored in the MROM. Using the AROM as an example, further reduction of its required storage capacity and hence its size is obtained by the practice of the invention.

A comprehensive set of secondary nanocontrol words for the functions controlled by the AROM are developed, and the represented signals are allocated to predetermined fields in the AROM word template. For those fields, such as AR_WT, which must always be guarded, all such secondary nanocontrol words are accordingly marked. A secondary nanocontrol word is then preprocessed. If, for the specific function defined by this control word, any fields should be guardable at the option of the firmware programmer (e.g., to handle unusual signal combinations), these fields are correspondingly marked. Similarly, if, for the specific function defined by this secondary nanocontrol word, any fields should be conditionally guardable, these fields are correspondingly marked. The term "conditionally guardable" in this context means that if a predetermined condition, such as the presence of some other signal simultaneously with the set of signals developed from the AROM, then the field must be guarded. The remaining fields for this control word are marked "don't care"; i.e., the function defined by this virtual control word will be properly carried out regardless of the state of the fields so marked.

The secondary nanocontrol word, all its fields having been analyzed, is now compared with another preprocessed secondary nanocontrol word, and a determination is made as to whether there is a match based on complementary control fields. That is, if the needed control fields in one of the control words are all "don't care" control fields in the other word (or are identical in content) and vice versa, then the two control words may be combined into a single secondary nanocontrol word which will carry out both functions accurately in conceit with other control signals originating elsewhere such as directly from the MROM control word. If no match is found, another preprocessed virtual control word is tried and so on until a match is either found or it is determined that the secondary nanocontrol word cannot be matched.

The principles of this combining procedure can readily be understood with reference to the simplified example shown in FIG. 9. In control word #1, field A has been marked as guarded, perhaps it is one that is mandatorily guarded. Field D has also been marked as guarded, perhaps field D is guardable, and the firmware programmer recognized that the signals to be controlled form this field as sensitive for this particular function and so he has used the option However, fields B and C have been identified as "don't care" for the control function represented by this control word; that is, whatever the contents of fields B and C, the function will be carried out correctly and without causing any secondary problems. In control word #2, field A is mandatorily guarded, and field B is also guarded, but fields C and D have both been identified as "don't care". Therefore, these two control words can be combined into a single control word which will be called to perform both functions A and B if the contents of field A are the same. Assuming that has been found to be the case, the combined control word will contain the appropriate in formation in field A, the guarded information from control word #2 in field B and the guarded control word from control word #1 in field D. It will be observed that field C remains "don't care" such that it is possible that this combined control word could be combined with yet another control word to further reduce the required number of combined control words to represent the function set.

This process is reiterated until all secondary nanocontrol words have been completely processed and all possible matches have been tried. As noted, during this process, it is possible that it will be found that more than two functions may be performed utilizing a single AROM control word which result in a further reduction in the size of the AROM virtual control word set. Finally, a still further reduction in the secondary nanocontrol word set can be accomplished if desired by conventional bit packing. For example, if the conditions are right, the bit-wise code "1001" (bit 0 on and bit 3 on) can be reduced to binary "101" (5) which is easily decodable to obtain the requisite signal combination Those skilled in the art will understand that there are various ways in which the procedure could be slightly revised to better fit a given environment. Referring again to FIG. 8, one such variant that is readily noted is that all the virtual AROM control words could be processed for marking in batch mode before the matching procedure is undertaken.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a pipelined central processing unit (CPU) having a microprogrammed execution unit including digital circuits for executing a repertoire of computer instructions, the execution unit including a plurality of read only memory (ROM) control stores in which are stored a number of binary control signals, or control bits, organized into control fields of one or more bits, which control bits control the digital circuits of the execution unit while executing a set of control bits, hereafter a control word, with each control field having a fixed position in a control word, the execution of a computer instruction requiring the execution of at least one control word by the execution unit to produce a desired result; the method of reducing the number of bits stored in the ROM control stores of the execution unit; comprising the steps of:

A) developing a control program comprising all of the control words necessary for the execution unit to execute all of the instructions of its repertoire, each control word of said control program including all of the control fields needed to control the operation of the digital circuits of the execution unit;

B) dividing the control fields of each of the control words of the control program to produce a primary set of control fields, hereafter, the primary set of control fields of each control word being designated as a primary nanocontrol word; and to produce at least one secondary set of control fields, the secondary set of control fields of each control word being designated as a secondary nanocontrol word, the position of each control field in each secondary nanocontrol word being fixed;

C) marking those control fields of each secondary nanocontrol word which affect the desired result produced by the execution unit in executing the control word from which each secondary nanocontrol word is produced in step B) as a "guarded" field; and marking those control fields of each secondary nanocontrol word which have no affect on the result produced by the execution unit in executing the control word from which each secondary nanocontrol word is produced in step B) as a "don't care" field;

D) combining a first and a second secondary nanocontrol words into single secondary nanocontrol word if guarded fields of the first word align with don't care fields of the second word, if guarded fields of the second word align with don't care fields of the first word, and if aligned guarded fields of the first and second secondary nanocontrol words are identical;

E) repeating step D) until no remaining secondary nanocontrol words can be combined;

F) producing a secondary ROM control store into which the secondary nanocontrol words remaining after the completion of step E) are stored at a location having an address; and G) producing a primary ROM control store into which the primary nanocontrol words identified in step B) plus an address field are stored, said address field containing bits of an address of a location in the secondary ROM control store at which is stored a secondary nanocontrol word containing the guarded control fields of the secondary nanocontrol word the control word of the control program from which the primary nanocontrol word is produced.

2. The method of claim 1 in which the microprogrammed execution unit including ROM control stores is implemented on a single very large scale integrated (VLSI) circuit chip.

3. The method of claim 2 in which the primary set of control fields produced in step B) of claim 1 are those fields which are required to be executed early during the execution of the control word from which they are produced.

4. The method of claim 3 in which the secondary set of control fields produce in step B) of claim 1 are those fields which perform an address function during the execution of the control word from which they are produced.

5. The method of claim 4 in which in step B) three secondary sets of control fields are produced, each of which is subjected to steps C), D), and E) of claim 1 and resulting in the production of a first, a second and a third secondary ROM control store, and in which the primary ROM control store further includes address fields of the secondary ROM control stores.

6. The method of claim 5 in which at the completion of step E) the secondary nanocontrol words remaining are compressed using bit packing techniques prior to the production of the first second and third secondary ROM control store.

7. In a pipelined central processing unit (CPU) having a microprogrammed execution unit implemented on a single VLSI chip, said execution unit including digital circuits for executing a repertoire of computer instructions, and a plurality of read only memory (ROM) control stores in which are stored a number of binary control signals, or control bits, of a control word, said control bits of each control word being organized into control fields of one or more control bits, with each control field having a fixed position in a control word, the control bits control the digital circuits of the execution unit while executing a control word, the execution of a computer instruction requiring the execution of at least one control word by the execution unit to produce a desired result; the method of reducing the number of bits stored in the ROM control stores of the execution unit; comprising the steps of:

A) developing a control program comprising all of the control words necessary for the execution unit to execute all of the instructions of its repertoire, each control word of said control program including all of the control fields needed to control the operation of the digital circuits of the execution unit;

B) dividing the control fields of each of the control words of the control program to produce a primary set of control fields, the primary set of control fields being those fields which are executed early in the execution of the control word from which they are produced, the primary set of control fields of each control word hereafter being designated as a primary nanocontrol word; and to produce at least one secondary set of secondary control fields, said secondary set of secondary control fields being those control fields of the control word from which they are produced which form addresses, the secondary set of secondary control fields of each control word being designated as a secondary nanocontrol word, the number of secondary control fields and the position of each secondary control field in each secondary nanocontrol word being the same;

C) marking those secondary control fields of each secondary nanocontrol word which affect the result produced by the execution unit in executing the control word from which each secondary nanocontrol word is produced in step B) as a "guarded" field; and marking those secondary control fields of each secondary nanocontrol word which have no affect on the result produced by the execution unit in executing the control word from which each first type secondary nanocontrol word is produced in step B) as a "don't care" field;

D) combining a first and a second secondary nanocontrol words into single secondary nanocontrol word if guarded secondary control fields of the first secondary nanocontrol word align with don't care secondary nanocontrol fields of the second secondary nanocontrol word, if guarded fields of the second secondary nanocontrol word align with don't care fields of the first secondary nanocontrol word, and if aligned guarded secondary control fields of the first and second secondary nanocontrol words are identical;

E) repeating step D) until no remaining secondary nanocontrol words can be combined;

F) producing a secondary ROM control store into which the secondary nanocontrol words remaining after the completion of step E) are stored;

G) producing a primary ROM control store into which are stored the primary nanocontrol words identified in step B) plus a secondary ROM control store address field, said secondary ROM control store address field containing bits of an address in the secondary ROM control store at which is stored a secondary nanocontrol word containing the guarded control fields of the control word of the control program from which the primary nanocontrol word is produced.

* * * * *